United States Patent
Li

(10) Patent No.: US 7,292,570 B2
(45) Date of Patent: Nov. 6, 2007

(54) SELF-ROUTING DEVICE FOR SWITCHING PACKETS OF DIFFERENT LENGTHS

(75) Inventor: Shuo-Yen Robert Li, Shatin (HK)

(73) Assignee: Industrial Technology Research Institute, Chutung Hsinchu (TW)

( * ) Notice: Subject to any disclaimer, the term of this patent is extended or adjusted under 35 U.S.C. 154(b) by 1126 days.

(21) Appl. No.: 09/882,317

(22) Filed: Jun. 15, 2001

(65) Prior Publication Data

US 2001/0053157 A1 Dec. 20, 2001

Related U.S. Application Data

(60) Provisional application No. 60/212,333, filed on Jun. 16, 2000.

(51) Int. Cl.
*H04L 12/50* (2006.01)

(52) U.S. Cl. .............. 370/388; 370/351; 370/392

(58) Field of Classification Search ............. 370/389, 370/466, 467, 471, 474, 476, 477, 229, 398, 370/360, 364, 372, 400, 386, 387, 388, 392, 370/395.21, 395.31, 395.42, 395.5, 401, 370/402, 404, 406

See application file for complete search history.

(56) References Cited

U.S. PATENT DOCUMENTS

| | | | |
|---|---|---|---|
| 4,523,273 A | 6/1985 | Adams et al. | |
| 4,623,996 A | 11/1986 | McMillen | |
| 4,852,091 A | 7/1989 | Li | |
| 4,899,334 A | 2/1990 | Shimizu | |
| 4,905,225 A | 2/1990 | Francois et al. | |
| 4,945,534 A | 7/1990 | Driscoll et al. | |
| 4,955,017 A | 9/1990 | Eng et al. | |
| 4,970,507 A | 11/1990 | Cooperman et al. | |
| 5,123,011 A | 6/1992 | Hein et al. | |
| 5,148,428 A | 9/1992 | Lee | |
| 5,166,926 A | 11/1992 | Cisneros et al. | |
| 5,184,346 A | 2/1993 | Kozaki et al. | |
| 5,216,668 A | 6/1993 | Zhang | |
| 5,299,317 A | 3/1994 | Chen et al. | |
| 5,303,383 A | 4/1994 | Neches et al. | |
| 5,353,283 A | 10/1994 | Tsuchiya | |
| 5,367,518 A | 11/1994 | Newman | |
| 5,367,520 A | 11/1994 | Cordell | |
| 5,369,635 A | 11/1994 | Gandini et al. | |
| 5,371,495 A | 12/1994 | Sturges et al. | |
| 5,396,231 A | 3/1995 | Hein | |

(Continued)

OTHER PUBLICATIONS

Access and Alignment of Data in an Array Processor, D. H. Lawrie, IEEE Trans. on Computers, vol. c-24, No. 12, Dec. 1975 pp. 1145-1155.

*Primary Examiner*—Phirin Sam
(74) *Attorney, Agent, or Firm*—Ronald W. Burns; Akin Gump Strauss Hauer & Feld LLP

(57) ABSTRACT

A technique for accommodating packets of different lengths at minimal cost to hardware complexity with a self-routing switch primitive with an associated switching mechanism that accommodates packets of different lengths encapsulated in a new packet format. The switch primitive, along with a new packet format, effects the self-routing such packets through a switching fabric constructed from the interconnection of the self-routing switching primitives.

18 Claims, 8 Drawing Sheets

U.S. PATENT DOCUMENTS

| | | | |
|---|---|---|---|
| 5,426,733 A | 6/1995 | Masui | |
| 5,450,074 A | 9/1995 | Yoshifuji | |
| 5,451,936 A | 9/1995 | Yang et al. | |
| 5,471,628 A | 11/1995 | Phillips et al. | |
| 5,483,541 A | 1/1996 | Linsky | |
| 5,500,858 A | 3/1996 | McKeown | |
| 5,506,840 A | 4/1996 | Pauwels et al. | |
| 5,517,495 A | 5/1996 | Lund et al. | |
| 5,541,914 A | 7/1996 | Krishnamoorthy et al. | |
| 5,566,179 A | 10/1996 | Kobayashi et al. | |
| 5,568,477 A * | 10/1996 | Galand et al. | 370/229 |
| 5,583,861 A | 12/1996 | Holden | |
| 5,600,630 A | 2/1997 | Takano et al. | |
| 5,602,844 A | 2/1997 | Lyles | |
| 5,623,698 A | 4/1997 | Stephenson et al. | |
| 5,671,222 A | 9/1997 | Chen et al. | |
| 5,689,505 A | 11/1997 | Chiussi et al. | |
| 5,689,506 A | 11/1997 | Chiussi et al. | |
| 5,724,349 A | 3/1998 | Cloonan et al. | |
| 5,724,351 A | 3/1998 | Chao et al. | |
| 5,768,270 A | 6/1998 | Ha-Duong | |
| 5,802,052 A * | 9/1998 | Venkataraman | 370/395.72 |
| 5,809,021 A * | 9/1998 | Diaz et al. | 370/364 |
| 5,841,775 A | 11/1998 | Huang | |
| 5,852,407 A | 12/1998 | Ishii et al. | |
| 5,859,846 A | 1/1999 | Kim et al. | |
| 5,896,371 A | 4/1999 | Kobayashi et al. | |
| 5,923,384 A * | 7/1999 | Enomoto et al. | 348/705 |
| 5,940,389 A | 8/1999 | Yang et al. | |
| 5,949,778 A | 9/1999 | Abu-Amara et al. | |
| 5,963,554 A | 10/1999 | Song | |
| 5,987,028 A | 11/1999 | Yang et al. | |
| 6,021,115 A * | 2/2000 | Simpson et al. | 370/235 |
| 6,052,373 A | 4/2000 | Lau | |
| 6,058,112 A | 5/2000 | Kerstein et al. | |
| 6,067,298 A | 5/2000 | Shinohara | |
| 6,081,512 A | 6/2000 | Muller et al. | |
| 6,157,643 A | 12/2000 | Ma | |
| 6,160,806 A * | 12/2000 | Cantwell et al. | 370/360 |
| 6,215,786 B1 | 4/2001 | Larson et al. | |
| 6,219,349 B1 | 4/2001 | Kobayashi et al. | |
| 6,259,699 B1 * | 7/2001 | Opalka et al. | 370/398 |
| 6,307,854 B1 | 10/2001 | Webb | |
| 6,335,930 B1 | 1/2002 | Lee | |
| 6,370,155 B1 * | 4/2002 | Cantwell et al. | 370/465 |
| 6,400,708 B1 | 6/2002 | Bartholomew et al. | |
| 6,427,037 B1 | 7/2002 | Okayama | |
| 6,434,141 B1 * | 8/2002 | Oz et al. | 370/352 |
| 6,473,827 B2 | 10/2002 | McMillen et al. | |
| 6,493,347 B2 | 12/2002 | Sindhu et al. | |
| 6,535,509 B2 * | 3/2003 | Amicangioli | 370/389 |
| 6,553,031 B1 | 4/2003 | Nakamura et al. | |
| 6,556,725 B1 | 4/2003 | Kondo et al. | |
| 6,563,819 B1 | 5/2003 | Park | |
| 6,563,837 B2 | 5/2003 | Krishna et al. | |
| 6,600,741 B1 | 7/2003 | Chrin et al. | |
| 6,611,519 B1 | 8/2003 | Howe | |
| 6,621,828 B1 * | 9/2003 | Field et al. | 370/466 |
| 6,628,651 B1 * | 9/2003 | Ryan et al. | 370/369 |
| 6,647,017 B1 | 11/2003 | Heimann | |
| 6,657,998 B2 | 12/2003 | Li | |
| 6,714,542 B1 * | 3/2004 | Tzeng et al. | 370/392 |
| 6,714,562 B1 * | 3/2004 | Calvignac et al. | 370/474 |
| 6,721,324 B1 | 4/2004 | Shinohara | |
| 6,735,203 B1 | 5/2004 | Heiman | |
| 6,741,594 B1 * | 5/2004 | Tzeng et al. | 370/392 |
| 6,747,971 B1 | 6/2004 | Hughes et al. | |
| 6,757,281 B1 * | 6/2004 | Irish | 370/389 |
| 6,757,282 B1 | 6/2004 | Ofek | |
| 6,768,738 B1 * | 7/2004 | Yazaki et al. | 370/392 |
| 6,798,777 B1 | 9/2004 | Ferguson et al. | |
| 6,829,237 B2 | 12/2004 | Carson et al. | |
| 6,831,893 B1 * | 12/2004 | Ben Nun et al. | 370/235 |
| 6,834,038 B1 | 12/2004 | Zelig et al. | |
| 6,850,524 B1 | 2/2005 | Troxel et al. | |
| 6,954,463 B1 * | 10/2005 | Ma et al. | 370/401 |
| 2002/0018475 A1 * | 2/2002 | Ofek et al. | 370/400 |
| 2002/0031124 A1 | 3/2002 | Li | |
| 2002/0176526 A1 * | 11/2002 | Mejia | 375/372 |

* cited by examiner

SELF-ROUTING DEVICE FOR SWITCHING PACKETS OF DIFFERENT LENGTHS

CROSS-REFERENCE TO RELATED APPLICATION

This application is a non-provisional application of provisional application Serial No. 60/212,333 filed Jun. 16, 2000.

BACKGROUND OF TEE DISCLOSURE

1. Field of the Invention

This invention relates to switching circuitry and, more particularly, to a self-routing switching device and concomitant methodology that accommodate packets of different lengths.

2. Description of the Background Art

A modem packet switch, including an IP (Internet Protocol) router, should efficaciously handle the integrated traffic generated by both narrow-band and broadband communication services. Real-time voice communications account for the bulk of narrow-band traffic and require small packet sizes to minimize packetization delay. Broadband communications, on the other hand, prefer large packet sizes in order to minimize the cost incurred in the per-packet overhead.

Uniform packetization of the mixed traffic, that is, restricting packets to the same length regardless of traffic, results in inefficiency, with the ATM (Asynchronous Transfer Mode) cell being a prominent example. However, it is generally true that a uniform packet size greatly simplifies the design of broadband switching fabrics and, thereby, somewhat enhances the switching efficiency. A notable example is "self-route switching" of uniform packets, where the switching fabric is constructed from the interconnection of primitive switching elements and the switching control of each element is by just the so-called "in-band" control signals carried by the input packets to this element (as discussed in more detail shortly). The extremely distributed nature of the switching control in this manner allows for the construction of a large broadband switching fabric from massive integration of most primitive switching elements, typically 2×2 elements.

The circuitry shown in FIG. 1 is representative of a typical, conventional 2×2 self-routing switching element 100. With reference to packet "frame" 201 shown in FIG. 2, wherein packet 205 having header 206 and payload 207 is shown as being representative of a packet communicated during time frame 201, the construction and operation of element 100 is as follows. In packet time frame 201, an independent packet represented by the form of packet 205, enters input port 101-1 (Input 0) and, concurrently, another packet enters input port 101-2 (Input 1) of the 2×2 element as serially propagated bits, that is, bit pipelined. The beginning bit(s) of each packet constitutes an "in-band" control signal, and is typically conveyed by header 206. Payload 207 conveys the actual data, that is, non-control data, communicated by packet 205. The two in-band control signals in the separate headers enter shift registers 102-1 and 102-2, respectively, associated with their respective input ports.

The "connection state" of switching element 100 may be broadly construed as the manner in which Input 0 and Input 1 are coupled to Output 0 and Output 1 in a given time frame. For instance, an exemplary connection state is one whereby Input 0 is connected to Output 1 and, concurrently, Input 1 is connected to Output 0 (such a connection state is oftentimes referred to as the "cross-state" of a 2×2 element). The selection of the connection state of switching element 100 is controlled by connection state circuitry 105 inside control section 103 of element 100. The connection state of element 100 is arbitrary at the beginning of each frame time (e.g., the connection state may be the connection state remaining at the completion of a previous frame). Thus, the connection state circuitry 105 uses the two in-band control signals provided by shift registers 102-1 and 102-2, respectively, to select a connection state. In particular, the connection state specifies which input (Input 0 or Input 1) is to be connected to Output 0, and more explicitly, which shift register (102-1 or 102-2) may feed its data into the multiplexer (or mux) 104-1 associated with Output 0; similarly, the connection state also specifies which input (Input 0 or Input 1) is to be connected to Output 1, and more explicitly, which shift register (102-1 or 102-2) may feed its data into the multiplexer (or mux) 104-2 associated with Output 1. Note that it is possible for an input to couple to more than one output. The operation of the connection state circuitry 105 is aided by two memory registers: the clock counter 106 and the latch status 109.

Thus, the in-band control signal indicates whether its packet is an idle expression and, for a non-idle packet, the intended output port(s) of the packet plus auxiliary information such as the priority class of the packet. The selection of the connection state attempts to route each of the two incoming packets to the intended output port(s) by the content of their in-band control signals. But, in case of a contention situation, e.g., when both incoming packets are of the same priority class and intended for the same output port, the selection of the connection state needs to resolve the contention by, for example, misrouting or blocking one of the two packets. On the other hand, when a packet is merely an idle expression, it is optional for the connection state to route the idle expression to an idle output.

In order to relate conventional self-routing switching to the invention described in the sequel, it is assumed that a connection state always connects each of the two outputs to an input. Thus, when the winner packet in the contention occupies only one of the two outputs, the loser packet is misrouted to the unoccupied output. Similarly, an idle expression is routed to some output unless a non-idle packet occupies both outputs.

As soon as the connection state is selected, it is "latched", that is, maintained throughout the duration of the flow of bits (both header and payload) in the packet, and will be unlatched at beginning of the next packet frame time. Latch status 109 may, for example, be a 1-bit register that keeps track of latching. Clock counter 106 is reset by the signal from frame clock 107; frame boundary markers (e.g., short duration pulses) for frame 201 and the next succeeding frame are shown by signals 210-1 and 210-2, whereby signal 201-1 indicates the start of the current frame 201, and signal 210-2 shows the start of the next frame. Clock counter 106 is incremented and progresses upon every signal from the bit clock 108 based upon the bit-rate of the incoming bits comprising a packet. Corresponding to each value of clock counter 106, control section 103 prescribes commands to control the two shift registers and the two multiplexers. Frame clock 107 and bit clock 108 are derived in any conventional manner from the incoming packet stream—for example, from synchronization circuitry (which is not shown because it is conventional) which determines frame clock 107 and bit clock 108.

Packet 205 of FIG. 2 illustrates the typical format of a packet. A packet may traverse through many primitive switching elements such as element 100 inside a self-routing switching fabric, and its in-band control signal for different switching elements on its route may be different. Upon entering the switching fabric, the header 206 of the packet must contain enough information to conveniently derive the in-band control signal for every switching element on the route. Upon entering each switching element, the in-band control signal needs to occupy a certain fixed bit position(s) at the front or near the front of the packet. Upon exiting the switching element, the same bit position(s) must be occupied by the in-band control signal for the next switching element on the route. Thus, each switching element on the route of the packet may make some quick change to the front bits of the packet. For example, the switching element may consume the leading bit of the packet.

Primitive switching element 100 exemplified by the above description of FIG. 1 functions only for packets of a uniform size. The prior art is devoid of a self-routing switching mechanism that accommodates packets of different lengths at a minimal additional cost to the hardware.

SUMMARY OF THE INVENTION

Certain limitations and other shortcomings and deficiencies are obviated in accordance with the present invention by circuitry, and a concomitant methodology, for accommodating packets of different lengths at minimal cost to hardware complexity by configuring a new self-routing switch primitive with an associated switching mechanism that accommodates packets of different lengths. Besides the new switch primitive, a new packet format is devised for self-routing such packets through a switching fabric constructed from the interconnection of the new switching primitives.

In accordance with one broad method aspect of the present invention, a method for concurrently routing frames through a switch wherein each of the frames is formatted with one of a plurality of formats, includes: (a) identifying the format of each of the frames; and (b) controlling the operation of the switch with reference to the format of each of the frames.

In accordance with one broad system aspect of the present invention, a system for concurrently routing frames through a switch wherein each of the frames is formatted with one of a plurality of formats, includes: (a) means for identifying the format of each of the frames; and (b) circuitry for controlling the operation of the switch with reference to the format of each of the frames.

BRIEF DESCRIPTION OF THE DRAWING

To facilitate understanding, identical reference numerals have been used, where possible, to designate identical elements that are common to the figures.

DETAILED DESCRIPTION

The present invention relates to a new self-routing switching primitive and method embodied by the primitive that accommodates packets of different lengths. To advantageously effect the method of the present invention, a new packet format is defined. The description provides details on the packet format, schematic structure of the primitive self-routing element, and transition of the connection state. Logic circuits at a detailed level commensurate with the well-known switching element 100 are not described since such details are readily apparent to someone with ordinary skill in the art. Only those aspects of the new primitive element relevant to the inventive subject matter are described in detail.

To simplify the description, but without loss of generality, all primitive self-routing elements are assumed to be 2×2, although the generalization to elements of other sizes is straightforward and is readily discernible.

1. Packet Formats

Figure 2:
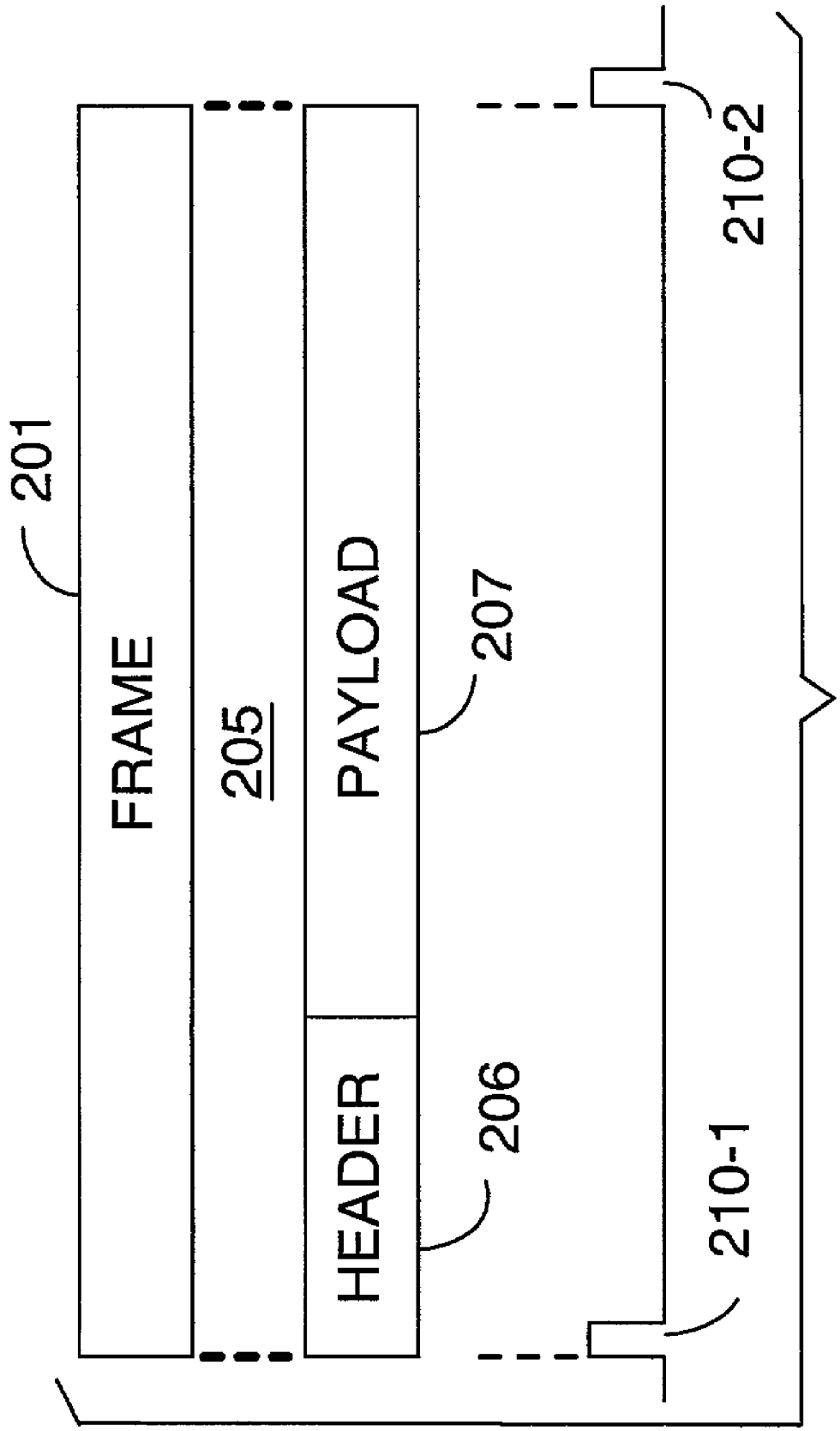
FIG. 2 depicts a conventional format of a packet to of a 2×2 self-routing switching element along with the timing scheme of a frame and the frame signals to the switching element.
Figure 3A:
FIGS. 3A, 3B, and 3C illustrate the two packet formats to be accommodated by the switching primitive in accordance with the present invention along with timing signals.
Figure 3B:
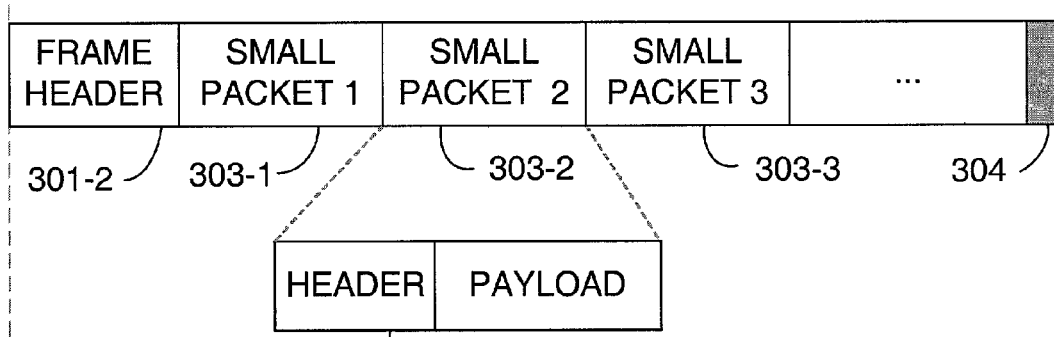
Figure 3C:
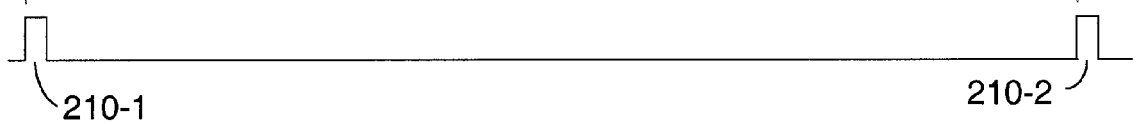

The generic data unit for switching, as guided by the depiction and discussion of FIG. 2, is a "frame" as now recast with reference to FIGS. 3A and 3B—FIG. 3A shows frame 300-1 whereas FIG. 3B shows frame 300-2. In each case, there is a frame header 301-1 or 301-2, respectively, and communications data manifested by a payload. The timing for each frame 300-1 or 300-2 is analogous to that depicted in FIG. 2, namely, each frame arrives in synchronization with the frame clock signal such as exemplified by signal 210-1 of FIG. 3C (signal 210-2 is the frame clock signal for the next frame).

Figure 4:
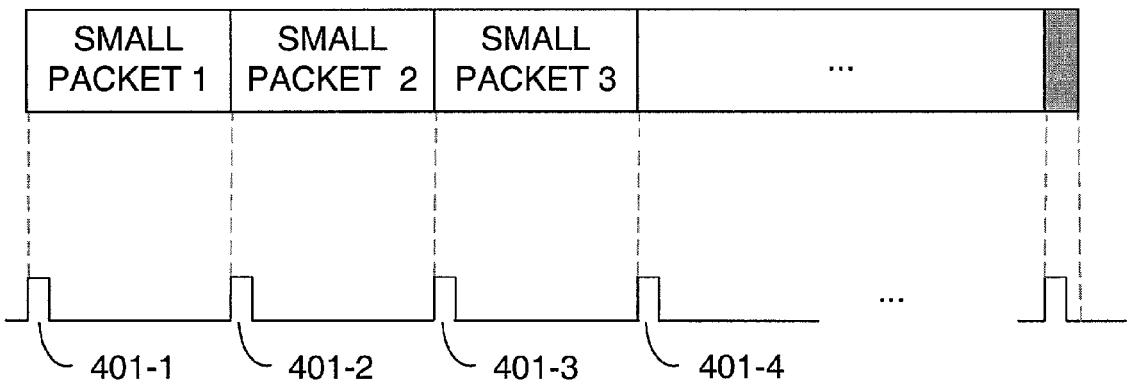
FIG. 4 illustrates the timing scheme of small packets and the slot signals to the switching primitive.
Figure 5:
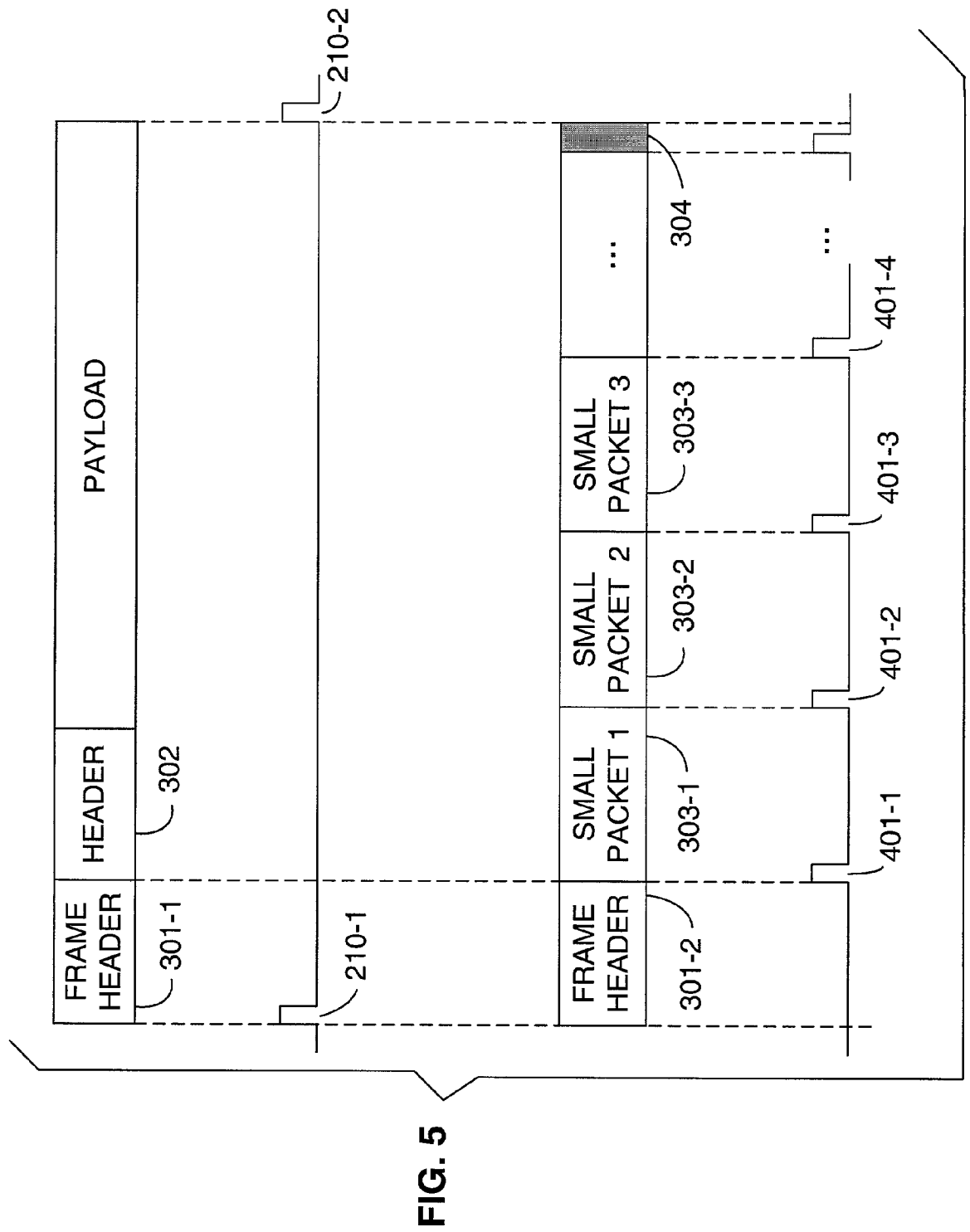
FIG. 5 illustrates the relations of the two frame clock signals.

Again, for sake of specificity but without loss of generality, only a large packet size and a small packet size are assumed, so there are two formats of the packet frame content in correspondence to the two packet sizes. One format of frame content is simply a large packet as exemplified by 300-1, which in turn includes a large-packet header 302 and a payload as in FIG. 3A. The alternative format partitions the frame content into a number of "slots" 303-1, 303-2, 303-3, . . . , and possibly some redundant bits 304, that is, filler bits; the slots contain "small packet 1", "small packet 2", "small packet 3", . . . , respectively, as depicted in FIG. 3B. Each slot thus carries a small packet, which includes a header 305 and a corresponding payload as depicted for slot 303-2. The frame header is always synchronized with the frame clock and serves to identify different packet formats, as summarized in FIG. 3C. The timing scheme for the sequence of small packets is depicted in FIG. 4; each small packet arrives in synchronization with the "slot clock" signal 401-1, 401-2, 401-3, . . . , and so forth. Finally, the relation between the frame clock signal and the slot clock signal, along with the large and small packet frames, is as summarized by FIG. 5.

When there are more than two packet sizes, the above scheme of packet formatting can be generalized by recursively packing a number of packets of one size into a capsule equally large as the next packet size. To simplify the description, only two packet sizes are assumed hereafter unless otherwise specified.

2. Structure of a 2×2 Switching Element

Figure 1:
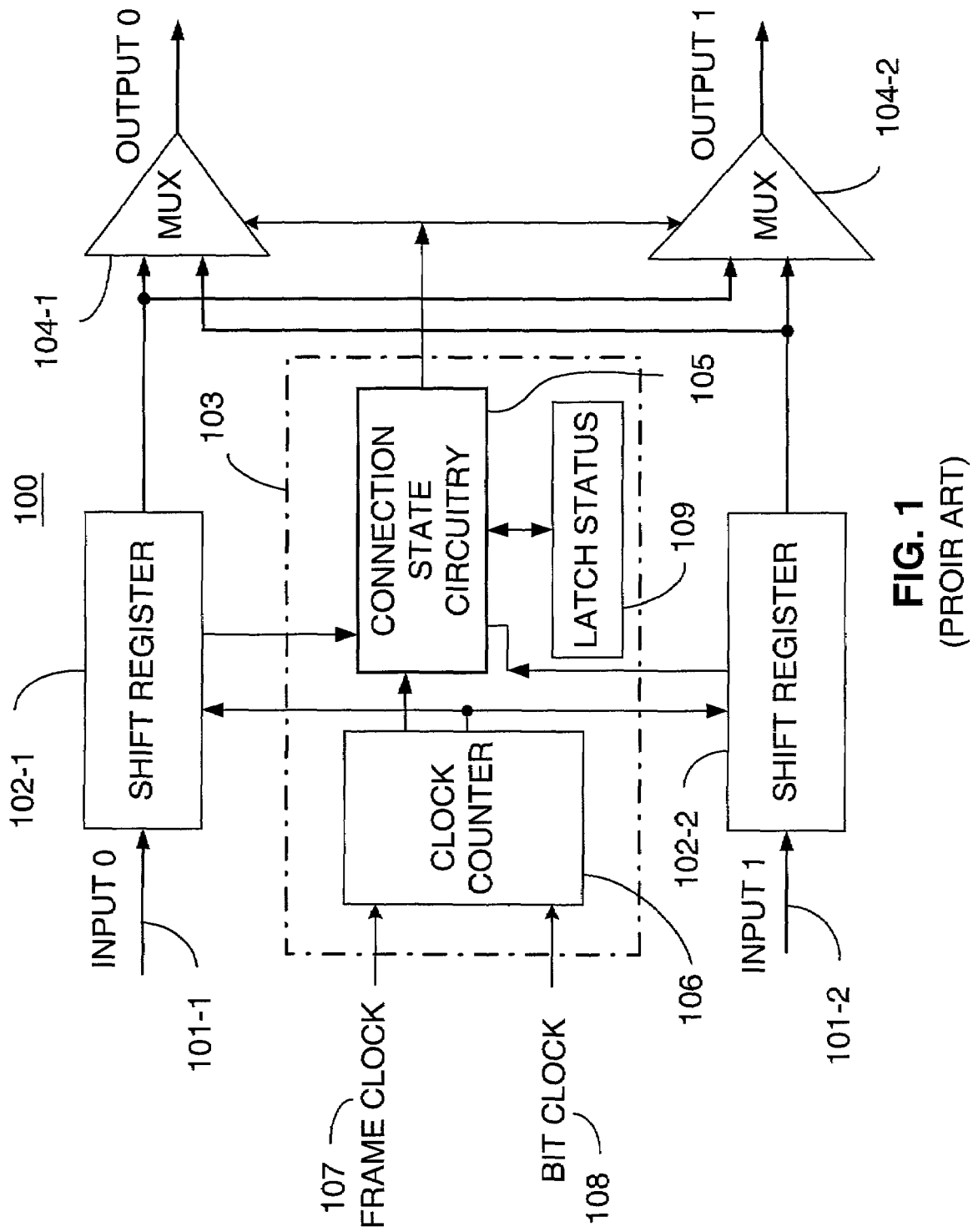
FIG. 1 illustrates generally a schematic of a conventional 2×2 self-routing switching element.
Figure 6:
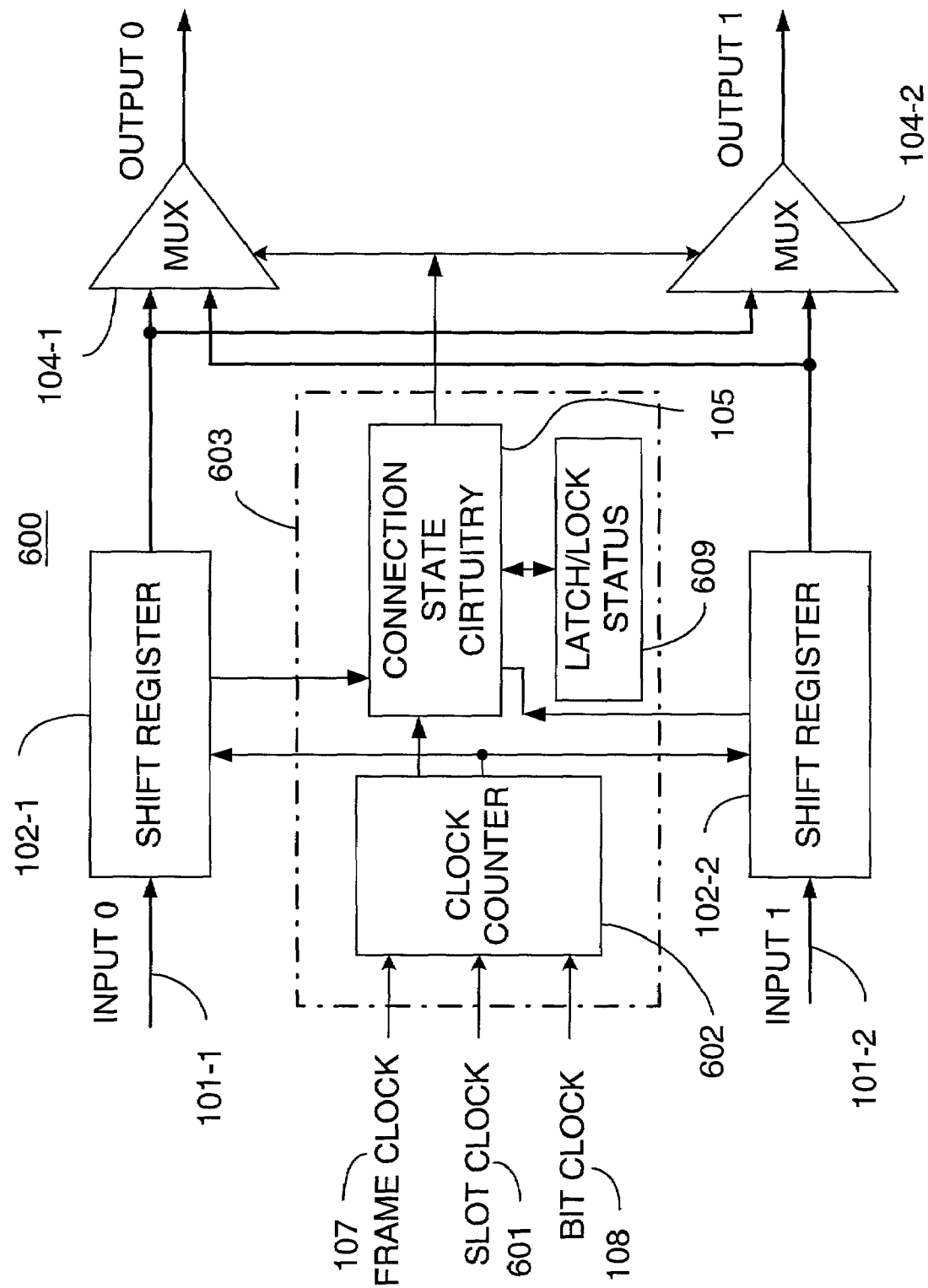
FIG. 6 illustrates the block diagram of the simple structure for implementing the hardware necessary to construct the enhanced 2×2 switching element in accordance with the present invention.

In comparison with the conventional self-routing switching element 100 of FIG. 1, two new components are overlaid on the element 100 to generate the new primitive switching element in accordance with the present invention; this structure of the new element, designated element 600 in FIG. 6, is implemented as follows: (a) there is an input for signaling using the slot signals 401-1, 401-2, 401-3, . . . . The sequence of slot signals is generically referred as the "slot clock" 601 in FIG. 6; and (b) there are two latch mechanisms (instead of the one mechanism engendered by latch 109 of FIG. 1) to control connection state 105, namely, one mechanism is activated for the duration of a large packet and the other mechanism for the duration of a small packet. The two mechanisms are to be referred to as "latch" and "lock", respectively. Control section 603 of switching element 600 keeps track of the status of both "latching" and "locking" and stores it in the memory register called the "latch/lock status" 609. Moreover, clock counter 602 is now reset by signaling from the slot clock 601 as well as the frame clock signals 201-1, 201-2, . . . , and bit transitions from bit clock 108 still increment clock counter 602.

3. Self-routing control of the 2×2 switching element Upon the frame clock signal 210-1, a frame arrives at each of the two inputs to the switching element synchronously. There are two levels in the self-routing control of the 2×2 switching element: the frame level and the slot level.

The frame clock signal 210-1 unlatches the connection state of the 2×2 switching element 600 and triggers the frame-level control. The frame header 301-1 or 301-2 at the beginning of the frame identifies the packet format to be either a large packet or a number of small packets. Aided by the two memory registers, clock counter 602 and latch/lock status 609, the connection state circuitry 105 inside the control section 603 may or may not set the connection state during the frame-level control. If the connection state is set during the frame-level control, it is latched throughout the whole frame. If neither frame contains a large packet, the connection state remains unlatched, that is, "latching" occurs only when at least one large packet arrives at the inputs. (When a frame is merely an idle expression, it is regarded as a degenerated case of the small packet format.) The frame-level control treats a frame for small packets no differently from an idle expression and selects the connection state in the way of the conventional self-routing switching as described in Background of the Disclosure.

Slot clock signal 601 unlocks the connection state if is locked, but does not unlatch the connection state. Clock signal 601 also triggers slot-level switching control, which takes effect only when the connection state is not latched. The slot-level switching control sets and locks the connection state in a manner analogous to conventional self-routing switching by regarding the slot as a mini-frame. The connection state locked during any particular slot is unlocked by the next slot clock signal 601, so the slot-level control is iterated once more in the new slot time.

The primary difference between a latched connection state and a locked connection state is in the two different clock signals 210-1 and 601 that reset them. Since a latched connection state preempts the slot-level control, the 2-level control effectively gives priority treatment to large packets.

Figure 7:
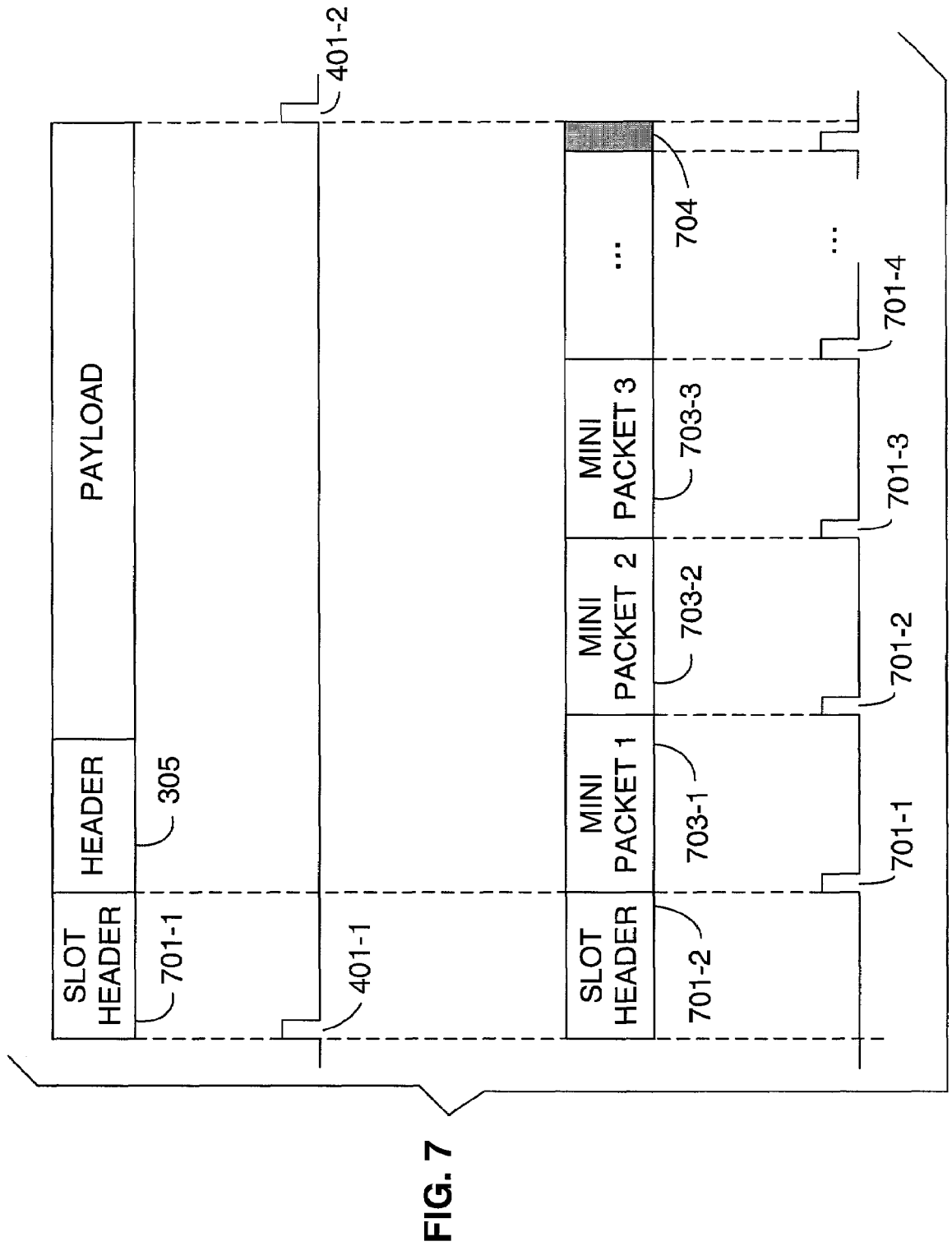
FIG. 7 illustrates the relations for the recursive application of the dual format.

As alluded to above, the scheme of packet formatting can be generalized into a recursive nested format for N packet sizes; concomitantly, there will be N levels of switching control each triggered by signaling from a different clock. Thus the latching of the connection state at each level is for the duration of a packet of the corresponding size. Take the example when there are three packet sizes: large, small, and mini. As before the frame payload 207 of a frame either contains a large packet or is partitioned into slots. Illustrated in FIG. 7, a slot now contains a slot header 701 and a slot payload. The slot payload either contains a small packet or is partitioned into mini-slots for carrying mini packets. Each mini packet arrives in synchronization with the "mini-slot clock" signal 701-1, 701-2, 701-3, . . . , and so forth. FIG. 7 also depicts the relation between the slot clock signal and the mini-slot clock signal.

4. Example of Frame/packet Header in Multistage Self-routing Switching

A self-routing switching fabric often contains multistage interconnection of switching elements. A packet routed through such a switching fabric has to traverse through a primitive switching element at each stage, and its in-band control signal for the switching at different stages may be different. Upon entering the switching fabric, the header of the packet must contain enough information to conveniently derive the in-band control signal for every switching element on the route. Below, with reference to FIG. 8, is an example of the frame/packet header for self-routing switching through a multistage interconnected switching elements.

The frame header 801-1 is a single bit, '1', for a large packet; for a frame of small packets, frame header 801-2 is a single bit, '0'.

Figure 8:
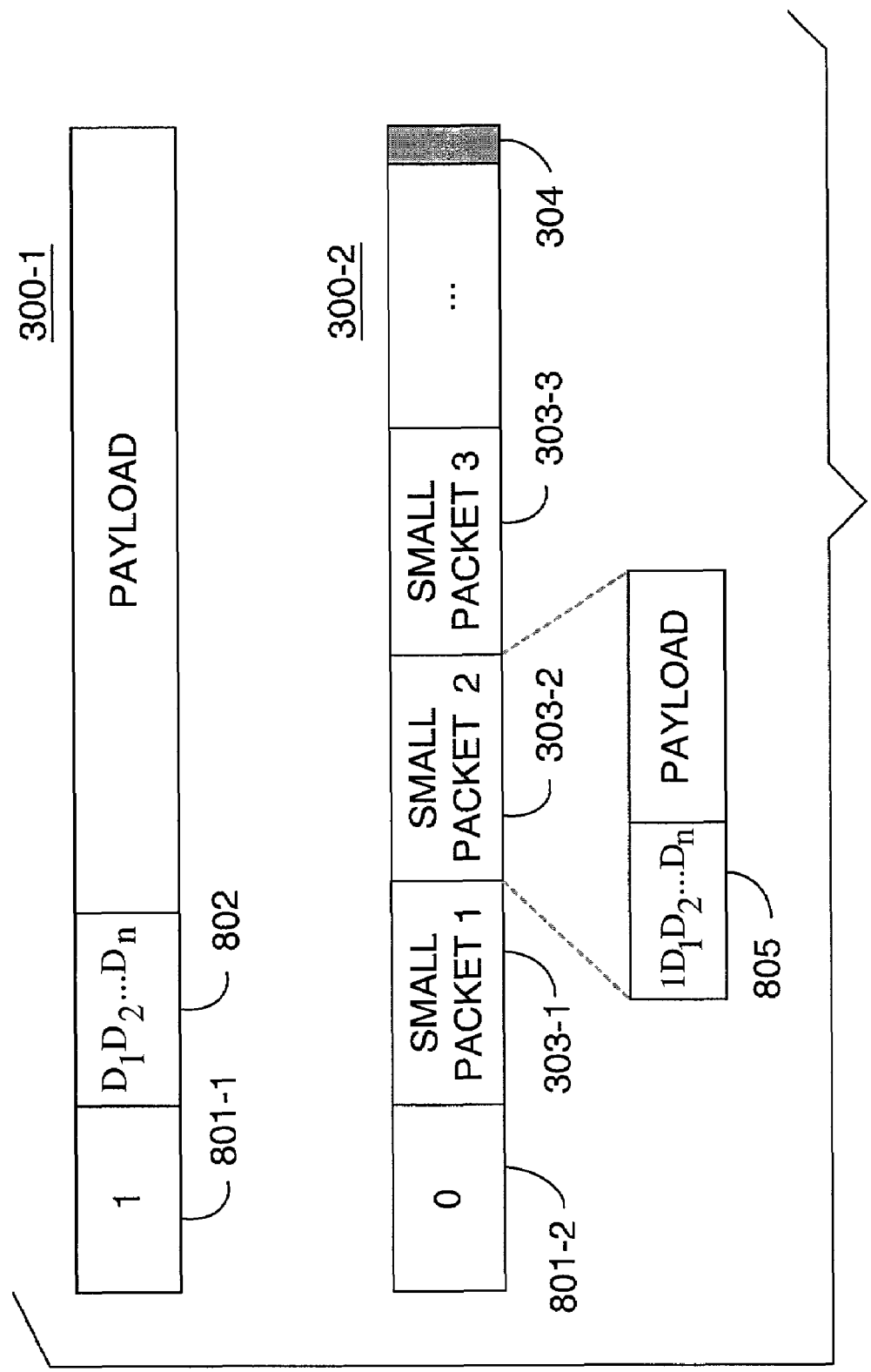
FIG. 8 is an example of an encoding scheme for the packet headers.

The large-packet header 802 in n-stage switching is shown in FIG. 8. The header of a large packet initially consists of a string of symbols $D_1, D_2, \ldots, D_n$. Each symbol is the in-band control signal at one stage of switching and is consumed at that stage. Thus the header of a large packet upon entering the stage-k switching element consists of symbols $D_k, D_{k+1}, \ldots, D_n$.

The small-packet header 805 is the same as a large-packet header 802 plus an "activity bit", which is '1' for an active small packet and '0' for an idle expression; this is exemplified for the small packet that occupies slot 303-2.

5. Processing by Primitive Switching Element 600

The operational processing effected by primitive switching element 600 is as follows, with reference to the example covered by FIG. 8; in particular, it is assumed that a frame in format 300-1 serves as Input 0 on path 101-1, and a frame in format 300-2 serves as Input 1 on path 101-2. The starting point for the processing is the arrival of frame clock signal 210-1 at the input to control circuit 603. It is presumed that element 600 has synchronized with the frame clock (107), the bit clock (108) and the slot clock (601) during prior packet/frame processing. Shift register 102-1 receives the bit '1' from header 801-1 as its first bit. Similarly, register 102-2 receives the bit '0' as its first bit from header 801-2. In turn, both first bits are detected by the connection state circuitry 105 in FIG. 6, which then finds the presence of a large packet and, accordingly, is committed to setting the connection state and latching it for the duration of the frame. If it is further presumed that element 600 is at the 1-st stage in the multistage switching fabric, then the D.sub.1 bit in packet header 802 is used to route frame in format 300-1. For example, if D.sub.1=0, then frame in format 300-1 is routed to Output 0; on the other hand if D.sub.1=1, then frame in format 300-1 is routed to Output-1. Since the frame-level control treats the frame 300-2 no differently from an idle expression, the frame in format 300-2 is routed to the opposite output in both cases.

Suppose another scenario in which two frames in format 300-2 serve as inputs to both Input 0 and Input 1. The header frame (801-2) of each frame contains a '0' bit, so the frame-level control does not latch the connection state, but rather leaves the decision to the slot-level control. Consider processing the first small packet in each frame ("small packet 1"). Each small packet has a header (like 805), and suppose each packet is an active packet (not an idle expression)—therefore, the first bit in the small packet header is a '1'. Next, it is presumed that $D_1=0$ for the first one of the packets and $D_1=1$ for the second one of the packets, so there is no contention. The connection state circuitry 105 then sets the connection state of the 2×2 element to the "bar-state", which connects Input 0 to Output 0 and connects Input 1 to Output 1. To activate the bar-state, connection state circuitry 105 signals MUX 104-1 to receive the first packet into Output 0 and signals MUX 104-2 to receive the second packet into Output 1. As soon as the connection state is set, the latch/lock status 609 becomes "locked".

Once all payload bits in each "small packet 1" are delivered, slot clock 601 signals the start of the next small packet ("small packet 2") and the connection state is unlocked, that is, the latch/lock status 609 becomes "neither latched nor locked". Then the first bit in each small packet header is detected to determine if the packet is active or idle. If each packet is active, then the $D_1$ bit in each packet is detected. Next, if it is presumed that $D_1=0$ for both small packets, then there is contention for Output 0. Moreover, assume that the resolution of the contention favors the second one between the two small packets. The connection state is then set to be the "cross-state" and locked for the duration of this slot. The processing now continues in a manner equivalent to that for "small packet 1".

6. Flow Diagram

Figure 9:
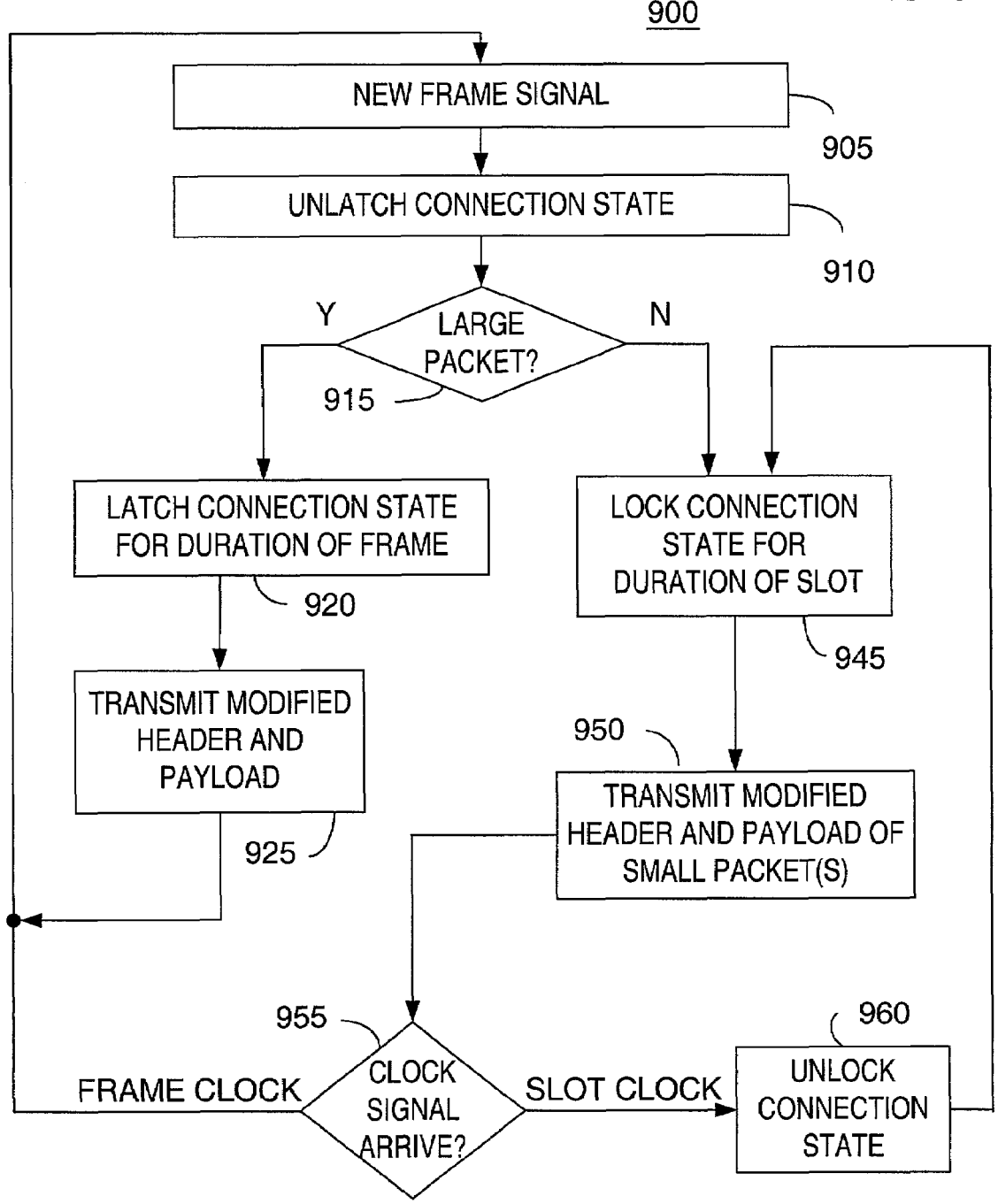
FIG. 9 is a flow diagram of the processing of the switch primitive in accordance with the present invention.

Flow diagram 900 of FIG. 9 depicts the processing effected by element 600 based upon incoming frames, as follows:

Process 905: a new frame signal initiates the overall processing of element 600 for each frame;

Process 910: the connection circuitry 105 is unlatched at the start of this iteration;

Process 915: a decision is made as to whether or not the frame contains a large packet;

Process 920: if a large packet is present, connection state of circuitry 105 is latched for the duration of the frame;

Process 925: for the large packet, self-routing is effected using the routing bits in the packet header (note that signaling from the slot clock at a time when the connection state is latched does not trigger any new control action);

Process 945: if no frame contains a large packet, then connection state of circuitry 105 is locked for the duration of a slot;

Process 950: for the small packet, self-routing is effected using the routing bits in the small-packet header;

Process 955: a frame or slot clock signal arrives; if it is from the frame clock, start a new iteration of process 905;

Process 960: if the clock signal is from the slot clock indicating another slot within the frame to be processed, then the connection state of circuitry 105 is unlocked, and a new iteration of process 945 is invoked.

Although the present invention has been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements which, although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, that is, any elements developed that perform the function, regardless of structure.

In addition, it will be appreciated by those with ordinary skill in the art that the block diagrams herein represent conceptual views of illustrative circuitry embodying the principles of the invention.

What is claimed is:

1. A method for concurrently routing frames through a switch wherein each of the frames is formatted with one of a plurality of formats, the method comprising:
   identifying the format of each of the frames, wherein the plurality of formats includes a first format for a single large packet and a second format for a plurality of small packets;
   controlling the operation of the switch with reference to the format of each of the frames;
   tracking a connection state of the switch with reference to the format of each of the frames; and
   storing the connection state in a memory register.

2. The method as recited in claim 1 wherein the switch is configured with connection states and wherein the controlling includes controlling the connection states of the switch so that a frame with the first format has precedence over a frame with the second format.

3. The method as recited in claim 2 wherein the controlling includes latching the connection states of the switch for a duration corresponding to each of the frames if at least one of the frames has the first format.

4. The method as recited in claim 2 wherein the controlling includes locking the connection states of the switch for each of a series of durations corresponding to sub-durations of each of the frames if the frames are only of the second format.

5. The method as recited in claim 1 further including additional switches so that all switches form interconnected switches, the identifying including identifying at each of the additional switches the format of each of the frames, and the controlling including controlling the operation of each of the additional switches with reference to the format of each of the frames.

6. A method for operating a switch configured with connection states, the method comprising:
   defining a dual-format frame for concurrently routing a plurality of frames through the switch, wherein a first format comprises a single large packet and a second format comprises a plurality of small packets;

identifying at the switch the format of each of the frames; and controlling the connection states of the switch with reference to the format of each of the frames.

7. The method as recited in claim 6 wherein the controlling includes latching the connection states of the switch for a duration corresponding to the large packet if at least one of the frames has the first format.

8. The method as recited in claim 6 wherein the controlling includes locking the connection states of the switch for each of a series of durations corresponding to each of the small packets if the frames are only of the second format.

9. A method for concurrently routing two incoming frames through a switch configured with connection states and wherein each of the incoming frames has either a first format containing a single large packet or a second format containing a plurality of small packets, the method comprising:
 (a) upon the start of the frames, unlatching the connection state of the switch;
 (b) determining if at least one of the frames contains a large packet; if not, continuing with (e);
 (c) latching one of the connection states based upon data in the large packet;
 (d) transmitting the data in the large and small packets, and then proceeding to (a);
 (e) locking the connection state based upon data in the small packets;
 (f) transmitting the data in the small packets;
 (g) receiving a frame or slot clock signal and, if the signal is from the frame clock, proceeding to (a); and
 (h) unlocking the connection state and returning to (e).

10. A switch for concurrently routing frames wherein each of the frames is formatted with one of a plurality of formats, the switch comprising:
 a means for identifying the format of each of the frames;
 a control circuit controlling connection states of the switch such that a first frame with a first format has precedence over a second frame with a second format;
 a control circuit controlling connection states of the switch such that a first frame with a first format may be given priority over a second frame with a second format; and
 a means for tracking a connection state with reference to the format of each of the frames.

11. A switching fabric comprising a multistage interconnection of primitive switches wherein each of the primitive switches is the switch as recited in claim 10.

12. The switch as recited in claim 10 wherein the control circuit includes means for latching the switch for a duration corresponding to each of the frames if at least one of the frames has the first format.

13. The switch as recited in claim 10 wherein the control circuit includes means for locking the switch for each of a series of durations corresponding to sub-durations of each of the frames if the frames are only of the second format.

14. The switch as recited in claim 10 wherein the first format contains a single large packet and the second format contains a plurality of small packets and the control circuit includes means for locking the connection states of the switch for each of a series of durations corresponding to each of the small packets if the frames are only of the second format.

15. Switching circuitry having: (i) connection state circuitry including connection states for concurrently routing two incoming frames arriving in bits wherein each of the frames is formatted with either a first format or a second format with slots so that either the connection state circuitry is latched for the duration of a frame whenever at least one of the incoming packets has the first format, or the connection state circuitry is locked for each of the slots whenever the frames have only of the second format; and (ii) a frame clock and a slot clock, the switching circuitry further including:
 (a) a clock counter for counting bits starting at the signal from either the frame clock or the slot clock,
 (b) a latch/lock device for registering one of the connection states,
 (c) a first shift register for receiving one of the two incoming frames and a second shift register for receiving the second of the two incoming frames, both registers being responsive to the clock counter,
 (d) said connection state circuitry, coupled to the clock counter, the latch/lock device, and the first and second shift registers, further including means for determining said one of the connection states, and
 (e) a first multiplexer providing a first output and a second multiplexer providing a second output, both multiplexers being controlled by the connection state circuitry to connect the registers to outputs of the switching circuitry.

16. A switching fabric comprising a multistage interconnection of primitive switches wherein each of the primitive switches is the switching circuitry as recited in claim 15.

17. A system, in combination with switching circuitry, for concurrently routing two incoming frames arriving in bits wherein each of the frames is formatted with either a first format or a second format used to generate slot clock signals, the switching circuitry including: (a) a clock counter for counting frame clock signals based upon the time duration of each of the frames and bit clock signals based upon the rate of bits conveyed by each of the frames; (b) a first shift register for receiving one of the two incoming frames and a second shift register for receiving the second of the two incoming frames, both registers being responsive to the clock counter; (c) connection state circuitry, coupled to the clock counter and the first and second shift registers, for determining a connection state for the switching circuitry; and (d) a first multiplexer providing a first output and a second multiplexer providing a second output, both multiplexers being controlled by the connection state circuitry to connect the shift registers to the outputs, the system comprising:
 a clock counter for counting bit clock signals starting either at the frame clock signals or the slot clock signals, and
 a latch/lock device for registering the connection state, the connection state circuitry being latched for the duration of frame whenever at least one of the incoming frames has a first format or being locked for each of the slots whenever the frames are only of the second format.

18. A switching fabric comprising a multistage interconnection of primitive switches wherein each of the primitive switches is the system as recited in claim 17.

* * * * *